Inventors:
Edward H. Lewis.
Clifford O. Hull.
by Harry E. Dunham
Their Attorney.

Patented May 31, 1938

2,119,393

UNITED STATES PATENT OFFICE 2,119,393

ELECTRIC CABLE AND METHOD OF MANUFACTURING THE SAME

Edward H. Lewis, Bridgeport, and Clifford O. Hull, Stratford, Conn., assignors to General Electric Company, a corporation of New York Application July 18, 1934, Serial No. 735,808

3 Claims. (Cl. 173—264)

Our invention relates to electric cable and the method of manufacturing the same, and more particularly to electric cable of the type known as all-rubber cord, although it is not limited thereto necessarily.

For certain applications such as, for example, for use in connection with some household electrical appliances, it is desirable to have a cord of minimum diameter. However, in the construction of cord, it is required by the Underwriters' Laboratories that there be a certain minimum thickness of insulation between individual conductors of the cord and that there be a certain minimum thickness of insulation between the individual conductors and the ground, i. e., between the conductors and the outer surface of the overall rubber jacket, in order to give the cord the desired factors of safety, and this results in applying certain definite limitations in cord construction.

One object of our invention is to provide an improved cord whereby we are enabled to obtain the desired amounts of insulation between the respective conductors and between each conductor and ground and at the same time provide a cord of a diameter less than those heretofore.

A further object of our invention is to provide an improved method of manufacturing cord of this type.

Figure 1:
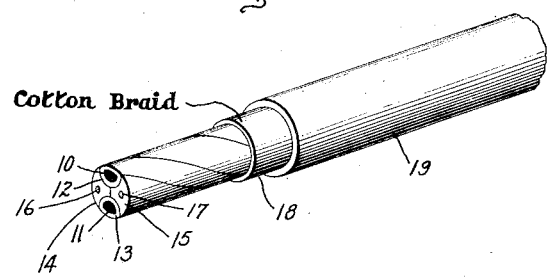
Figure 2:
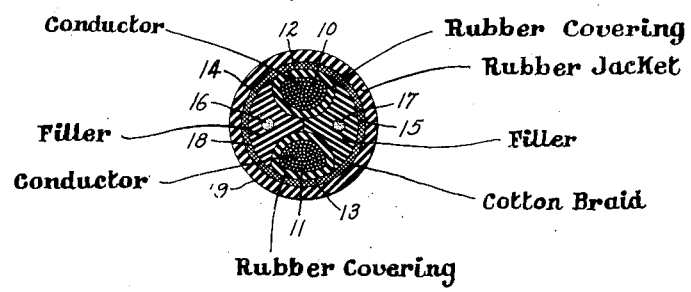

What we consider to be novel and our invention will be better understood by reference to the following specification and appended claims when considered in connection with the accompanying drawing in which Fig. 1 is a perspective view of the cable with some of the layers of insulation cut away to expose the layer beneath and Fig. 2 is a sectional view of the cable.

Referring to the drawing, 10 and 11 indicate two stranded electric conductors. Over the conductors 10 and 11 are layers of rubber insulation 12 and 13, respectively. After the application of the layers of rubber insulation 12 and 13, the conductors and insulation are passed through a vulcanizing chamber to completely vulcanize these coverings of insulation. Fillers 14 and 15 are provided consisting of rubber extruded over fibrous cores of hemp or twine 16 and 17 respectively. The purpose of the cores is to give increased tensile strength to the fillers. The fillers 14 and 15 are joined with the conductors 10 and 11 with their vulcanized rubber coverings 12 and 13 and all are twisted together while the rubber fillers 14 and 15 are still in the plastic or unvulcanized state. During the twisting-operation, material of the fillers is forced between the conductors 10 and 11 with their vulcanized rubber insulations 12 and 13 so as to space these conductors apart a distance equal to the thickness of the insulation on conductors 10 and 11 plus the thickness of the filler material between the conductors. This provides between the two conductors a thickness of insulating material sufficient to meet requirements. The conductors and fillers are twisted together in a machine provided with a round die to form the assembly with an exterior circular surface. The forcing of the rubber or fillers 14 and 15 between the conductors 10 and 11 so fixes the spacing of these conductors as to make it unnecessary to provide a thick walled individual insulation over each of the conductors to insure a sufficient spacing of these conductors. This reduces the amount of insulation which must be provided on the conductors without reducing the total thickness of insulation between the conductors. To make the combined surface of the twisted conductors circular, it is generally the practice to use a filler of hemp or cord which is not nearly as flexible as the rubber fillers 14 and 15. Over the assembly of conductors and filler, a cotton braid 18 is provided which serves as a separator between this assembly and an overall rubber jacket 19 which is extruded over the braided covering 18. When the outer jacket 19 is vulcanized the fillers 14 and 15 are also vulcanized. The method of twisting the conductors with their vulcanized rubber covering together with unvulcanized rubber fillers results in a construction which reduces the overall size of the cable without reducing the resultant ability of the cable to withstand the voltage stresses which may be imposed upon it and in addition produces a cable which is very flexible as well as having the other desirable characteristics inherent in all-rubber cable.

In connection with cord of this type, the overall rubber jacket, to meet the Underwriters' requirements, must have a certain fixed minimum thickness. Now, if the insulations 12 and 13 on the individual conductors were made thick enough that, when the two insulated conductors were placed in contact with each other, there would be sufficient insulation between them, a structure would result wherein the amount of insulation between the conductors and ground would be in excess of that required. However, by placing on the conductors 10 and 11 thinner insulation, there is still provided sufficient insulation between the conductors and ground to meet requirements. Then the additional insulation between the individual conductors to meet requirements is provided by the portions of the fillers located between the insulated conductors. As a result, there is provided a conductor which is of smaller overall diameter but which at the same time has the required amount of insulation between the two conductors and between each conductor and ground.

What we claim as new and desire to secure by Letters Patent of the United States is:

1. An electric cord comprising twisted together conductors each provided with insulation of a thickness insufficient to insulate the two conductors from each other for their intended potential difference were they twisted together in direct contact with each other, fillers of insulation twisted with the conductors and extending between them to provide the required thickness of insulation between conductors, and an insulating overall covering of a thickness sufficient to provide the required insulation between the conductors and ground whereby the cord is correspondingly reduced in over-all dimensions for the same insulating value.

2. An electric cord comprising twisted together conductors each provided with insulation of a thickness insufficient to insulate the two conductors from each other for their intended potential difference were they twisted together in direct contact with each other, fillers of insulation twisted with the conductors and extending between them to provide the required thickness of insulation between conductors, the outer surfaces of the fillers forming with the outer surfaces of the insulation on the conductors a structure substantially circular in cross-section, and an insulating overall covering of a thickness sufficient to provide the required insulation between the conductors and ground whereby the cord is correspondingly reduced in over-all dimensions for the same insulating value.

3. The method of manufacturing an electric cord which comprises providing conductors having thereon insulation of a thickness insufficient to insulate the two conductors from each other for their intended potential difference were they twisted together in direct contact with each other, twisting said insulated conductors together with fillers of deformable insulating material to force sufficient of the insulating material of the fillers between the conductors to provide sufficient thickness of insulation between conductors, and then placing an overall covering on the assembly of a thickness to provide the required insulation between the conductors and ground.

EDWARD H. LEWIS.
CLIFFORD O. HULL.